Patented June 23, 1942

2,287,672

UNITED STATES PATENT OFFICE 2,287,672

CONVERSION OF HYDROCARBONS

Frank C. Fahnestock, Woodbury, N. J., assignor to Socony-Vacuum Oil Company, Incorporated, New York, N. Y., a corporation of New York No Drawing. Application October 4, 1941,
Serial No. 413,647

4 Claims. (Cl. 196—52)

This invention has to do with processes for the conversion of hydrocarbons in the presence of a contact mass which contact mass is regenerated in situ in a cyclic process involving reaction of hydrocarbons with concurrent deposition of combustible material upon the contact mass, followed by burning the combustible from the contact mass to regenerate it.

In such processes it is customary to effect a purging of hydrocarbon vapors from the contact mass prior to regeneration, and a purging of regenerating medium and regeneration products from the contact mass prior to return to reaction. Since the reaction and regeneration are frequently conducted at different pressure levels, and since in many cases a most effective means of purging is partial or complete evacuation, particularly in the purging between regeneration and reaction, it is necessary to adjust the pressure upon the contact mass, prior to return to reaction, to reaction pressure level. A method widely practiced for this repressuring is the introduction to the contact mass of light hydrocarbon vapors at the desired pressure level.

In such operations, it is customary to introduce reactant vapors, regenerating media, repressuring media and similar process fluids into the contact mass by means of distributing tubes embedded in the contact mass which tubes have orifices at selected points along their side walls through which the process fluid may pass from within the distributing tube to within the contact mass. Such apparatus is shown, for example, in U. S. Patent 2,078,947, to Eugene Houdry.

During the regeneration of such contact masses by oxidation of the combustible deposit from reaction, it is important that the regeneration be uniform in character. Localized areas of high temperature during regeneration give rise to localized portions of contact mass different in characteristics from other contact mass. These areas in turn act differently during the following reaction and regeneration and tend to compound the difficulty in continuously departing farther from normal.

It has been found that when repressuring with light hydrocarbons that during subsequent regeneration, hot spots tend to develop in the contact mass adjacent the points at which the repressuring medium was introduced to the contact mass. These hot spots are very difficult to control or suppress by usual methods such as control of regeneration medium inlet temperature, control of flow of fluid heat transfer media, and other means applicable to less highly localized difficulties. Allowed to persist, they may eventually seriously reduce the conversion efficiency of the contact mass as a whole. When high in degree, they may result in complete destruction by sintering, etc., of the contact mass area affected. Even if not that serious they may seriously interfere with proper reactant distribution. Even when not pronounced, they may end with the locally affected catalyst more active than the general mass, which in turn causes greater deposition of combustible during reaction, which then causes higher temperature in the local hot spot and so the evil is compounded until definite damage results.

This invention has for its object the provision of a method of hydrocarbon conversion in a contact mass embracing a method of repressuring with hydrocarbons so handled as to be capable of suppressing the development of localized hot spots during subsequent regeneration.

This invention is based upon the discovery that the use of controlled amounts of steam in admixture with hydrocarbon repressuring media can achieve complete suppression of such hot spot phenomena.

While this invention is not predicated upon any particular theory surrounding the action of the steam, the following theory is believed plausible and will serve at least as a basis for explanation of the invention.

When the regeneration of the contact mass is finished, assuming it to have been a normal regeneration, without localized hot spots, the contact mass is fairly uniform in temperature and activity. After purging, light hydrocarbons are introduced for repressing. The temperatures are high enough for decomposition of the hydrocarbon to take place, and this takes place in the contact mass immediately adjacent the point of entry of repressure medium, with a resultant deposit of coke at that point somewhat in excess of that arising from similar cause throughout the rest of the contact mass. This excess persists during the subsequent reaction. Upon the next regeneration, this portion of contact mass ends up with higher temperature than surrounding contact mass. During the next repressuring, localized reaction and coke deposit are greater than before. So, the localized action builds up to a noticeable magnitude and tends to become so great as to prevent suppression by usual means. On the contrary, if steam in controlled amounts is introduced in admixture with the hydrocarbon repressuring medium, the localized high activity is suppressed, or it may be altered in kind, resulting in some reaction not depositing carbon. At any rate, whatever the action may be in actuality, the introduction of steam with hydrocarbon repressuring medium results in suppression of hot spots noted during regeneration in a process, otherwise the same except for the use of steam during repressuring.

The steam to be used varies in amount with the type of repressuring medium used. To be more exact, it may be said that increases in the molecular weight of the hydrocarbons used in repressuring calls for increases in amount of steam used. Estimations of the maximum amount of steam to be used with a particular repressuring medium, or estimation of the change in steam usage called for by a change in type of repressuring medium may be made by equations based upon the same bases as those for calculating ordinary steam distillation. In such computations, the molecular weight and proportion of heaviest hydrocarbon present in the repressuring medium characterize the computation for the particular medium. In general, values so computed are merely indicative. Practical control may be effected within effective commercial limits by admixing steam to the extent of 20% to 30% by weight of the total repressuring medium, with lesser amounts being proportionately effective in all cases and completely effective in some cases, particularly when the repressuring hydrocarbons are substantially mixtures of normally gaseous hydrocarbons containing little material of higher boiling point.

I claim:

1. In hydrocarbon conversion processes wherein hydrocarbons are converted in the presence of a contact mass and the contact mass is subsequently regenerated and in which the regenerated contact mass is treated after regeneration and before reaction by introducing thereto a hydrocarbon lighter than the hydrocarbons which are to be converted, the improvement comprising admixing steam with said light hydrocarbon medium in quantities sufficient to prevent development of localized high temperature zones at points adjacent light hydrocarbon medium entry points upon subsequent regenerations.

2. In hydrocarbon conversion processes wherein hydrocarbons are converted in the presence of a contact mass and the contact mass is subsequently regenerated and in which the regenerated contact mass is brought to reaction pressure level after regeneration and before reaction by introducing thereto a hydrocarbon repressuring medium, the improvement comprising admixing steam with said hydrocarbon repressuring medium in quantities sufficient to prevent development of localized high temperature zones at points adjacent repressuring medium entry points upon subsequent regenerations.

3. In hydrocarbon conversion processes wherein hydrocarbons are converted in the presence of a contact mass and the contact mass is subsequently regenerated and in which the regenerated contact mass is brought to reaction pressure level after regeneration and before reaction by introducing thereto a hydrocarbon repressuring medium, the improvement comprising admixing steam with said hydrocarbon repressuring medium in quantities up to about 30% by weight and sufficient to prevent development of localized high temperature zones at points adjacent repressuring medium entry points upon subsequent regenerations.

4. In a cyclic process for hydrocarbon conversion comprising passing hydrocarbon vapors at conversion temperature and pressure over a contact mass, and regeneration of contact mass to remove deposited products of conversion therefrom, with an operation in the non-reaction portion of said cycle at a pressure different from the pressure level for reaction, the improvement which comprises adjusting the pressure within the contact mass to reaction pressure level before entry of reactants by introducing to said contact mass a mixture of light hydrocarbons and steam, the steam being present to the extent of not more than about 30% by weight of said mixture.

FRANK C. FAHNESTOCK.